No. 734,956. PATENTED JULY 28, 1903.
J. L. RESSLER.
REVERSIBLE COMBINED POULTRY PERCH, FEED TROUGH, AND VERMIN EXTERMINATOR.
APPLICATION FILED MAR. 3, 1903.
NO MODEL.
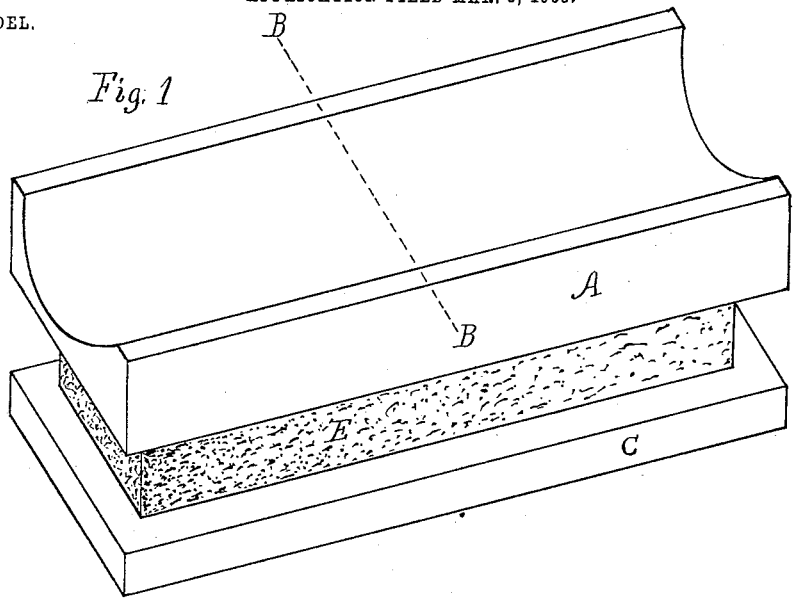
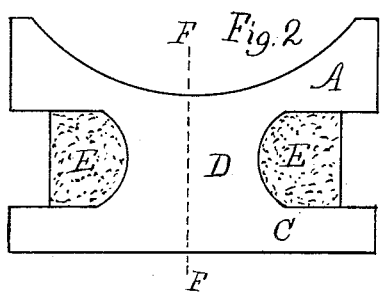 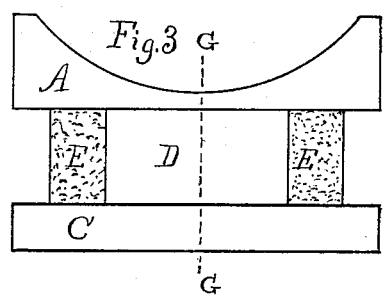
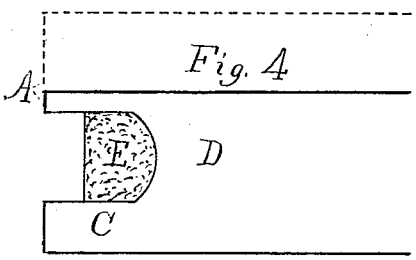 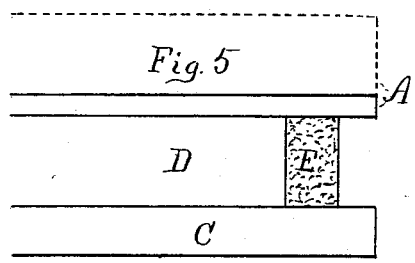
Witnesses
Charles Johnson
M. H. Weaver
John L. Ressler,
Inventor
By
Stanton Weaver
Attorney No. 734,956. Patented July 28, 1903.

UNITED STATES PATENT OFFICE.

JOHN L. RESSLER, OF SALEM, OHIO.

REVERSIBLE COMBINED POULTRY-PERCH, FEED-TROUGH, AND VERMIN-EXTERMINATOR.

SPECIFICATION forming part of Letters Patent No. 734,956, dated July 28, 1903.

Application filed March 3, 1903. Serial No. 145,934. (No model.)

*To all whom it may concern:*

Be it known that I, JOHN L. RESSLER, a citizen of the United States, residing at Salem, in the county of Columbiana and State of Ohio, have invented certain new and useful Improvements in a Reversible Combined Poultry-Perch, Feed-Trough, and Vermin-Exterminator, of which the following is a specification.

My invention relates to improvements in poultry-perches, poultry feed-troughs, and exterminators of lice and other similar vermin which infest fowls; and the objects of my improvement are, first, to provide a perch on which fowls shall be constantly enveloped in the volatile insect-destroying vapors or gases arising from a suitably-arranged deposit for a fluid containing the proper elements for the purpose specified; second, to provide on the reverse side of said perch a feed-trough on which the fowls shall be subject to the same treatment; third, to provide a channel or receptacle in connection with said reversible combined perch and feed-trough for a porous, fibrous, spongy, or other suitable material for absorbing a fluid containing volatile elements which will destroy insects on fowls. I attain these objects by the device illustrated in the accompanying drawings, in which—

Figure 1 is a perspective view of the entire device; Fig. 2, a vertical section of the device on the line B B when made with a concave channel in the sides thereof, and Fig. 3 same vertical section when made with a rectangular channel; Fig. 4, a vertical section of Fig. 2 on the line F F, and Fig. 5 a vertical section of Fig. 3 on the line G G.

Similar letters refer to similar parts throughout the several views.

A represents the feed-trough, running the full length of the device.

C represents the perch, also running the full length of the device.

E represents the fibrous or spongy material surrounding the central portion or stem, which connects the trough A with the perch C.

A, C, and D may be made integral, as shown in Fig. 2, or in parts, as shown in Fig. 3, and are preferably made of wood, but other material may be used, if desired. The channel for the fibrous or spongy material E may be concave, as shown in Figs. 2 and 4, or rectangular, as shown in Figs. 3 and 5.

E may be made of sponge, flannel, loose cord, or any other suitable material which will absorb a fluid and allow it to escape slowly by evaporation and may be wound around the stem D or in case the device is made in parts may be cut to fit the central stem D.

This device should be made long enough to reach across the coop or pen. It should be supported at each end at a suitable height from the floor for a perch or roost and be readily put either trough or perch side up. As illustrated in the drawings, the trough side is uppermost. Reversed the part C is uppermost, and it thus becomes a perch or roost for the fowls. In either position the vapors arising from the fluid-saturated part E penetrate the plumage of the fowls and attack the lice, &c., which may be on the fowls. The trough A and perch C are made to extend beyond and overhang the fibrous or spongy part E to prevent said part E becoming soiled and clogged by the droppings of the fowls.

I am aware that prior to my invention kerosene-oil and other fluids have been placed on the roosts or perches to destroy lice, &c. I do not claim such an application of insect-destroying fluids broadly; but What I do claim as my invention, and desire to secure by Letters Patent, is—

1. The combination of a perch or roost for fowls, with a feed-trough, having a connecting-stem surrounded by a fibrous, spongy or other absorbent material, substantially as shown, and for the purposes specified.

2. The combination of a reversible perch or roost for fowls, and longitudinal feed-trough, substantially as and for the purposes specified.

3. The combination of a reversible perch or roost for fowls, with a longitudinal feed-trough, and a suitably-arranged deposit of fibrous, spongy or other absorbent material, substantially as and for the purposes set forth.

4. The combination of a perch or roost for fowls, a feed-trough longitudinally connected therewith by an interposed stem, and a channel or receptacle provided with an absorbent material, in which the sides of said perch and trough overhang or extend beyond the vertical line of said absorbent material, as shown, and for the purposes specified.

In testimony whereof I have affixed my signature in presence of two witnesses.

JOHN L. RESSLER.

Witnesses:
GEO. MCARTOR,
J. B. BOSTEN.